Dec. 10, 1929.  H. S. JANDUS ET AL  1,739,235
BUMPER
Filed Sept. 7, 1926
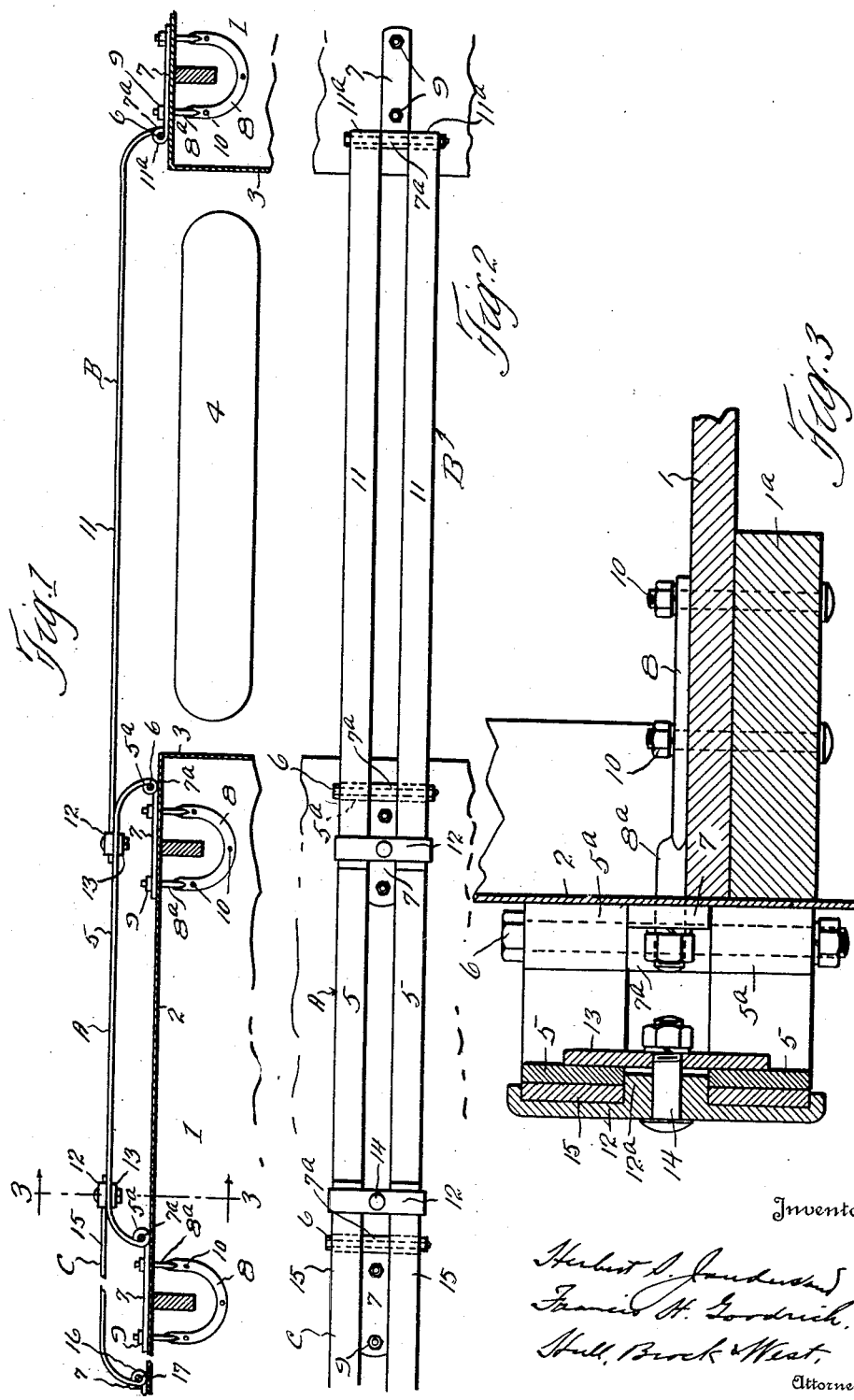
Inventors
Herbert S. Jandus
Francis H. Goodrich
Stull, Brock & West
Attorneys Patented Dec. 10, 1929

1,739,235

UNITED STATES PATENT OFFICE

HERBERT S. JANDUS AND FRANCIS H. GOODRICH, OF DETROIT, MICHIGAN, ASSIGNORS, BY MESNE ASSIGNMENTS, TO GENERAL SPRING BUMPER CORPORATION, A CORPORATION OF MICHIGAN

BUMPER

Application filed September 7, 1926. Serial No. 133,843.

This invention relates to bumpers for automobiles, and more particularly to bumpers that are intended to be applied to and used with the sides of automobiles, and especially with omnibuses. It is the general purpose and object of the invention to provide a bumper of this character which is particularly adapted for the use referred to; also to provide for such bumper attaching means enabling the same to be quickly and conveniently applied to the sides of such vehicles.

Further and more limited objects of the invention will appear hereinafter and will be accomplished through the construction and arrangement of parts shown in the drawings, wherein Fig. 1 represents a sectional plan view of the bumper, showing the same applied to the side of a vehicle of the omnibus type; Fig. 2 a side elevation of the bumper and associated parts shown in Fig. 1; and Fig. 3 a detail in section corresponding to the line 3—3 of Fig. 1.

Describing the various parts by reference characters, 1 denotes the floor of an omnibus, $1^a$ a side sill therebeneath, 2 the side panel thereof above said floor, and 3 the housing for a rear wheel 4. With this construction, we employ a bumper which is made up of several longitudinally-extending sections. One of these sections will be referred to hereinafter as the "main" section, and is preferably applied to the side of the omnibus in front of and adjacent to the rear wheel housing. From this main section there extends a rear auxiliary section, which covers the rear wheel housing, and one or more auxiliary front sections (depending upon the length of the omnibus). The construction of the bumper sections and of the means for supporting the same will now be described in detail.

The main section, indicated at A, comprises a pair of vertically spaced bars 5 each having its ends directed inwardly (or toward the side of the vehicle), the ends of the bars being provided each with an eye $5^a$. These eyes are secured by bolts 6 to eyes $7^a$ each carried by a plate 7, each eye $7^a$ being inserted between the eyes $5^a$ on the ends of the bars 5 adjacent thereto. The plates 7 are secured in place by means of special U-bolts each having the threaded ends $8^a$ extending through the side panel 2 and through openings in the plate 7 and being secured thereto by the usual nuts 9. The body 8 of each U bolt 8 is flattened so as to provide a flat horizontal bearing surface upon the floor 1 to which and the sill $1^a$ the bolt is fastened by bolts 10.

Extending rearwardly from the main section A of the bumper is an auxiliary section B. This section comprises upper and lower bars 11 which are adapted to bear against the outer faces of the bars 5, preferably beyond the curved end portions thereof, being secured to the bars 5 by clamping plates 12 and 13, the outer plate 12 being preferably provided with a central inwardly extending spacing projection $12^a$, adapted to engage the bottom edges of the upper bars 5 and 11 and the upper edges of the bottom bars 5 and 11. The plates 12 and 13 are connected by a bolt 14. The manner of securing together the bars of sections A and B is shown in Fig. 3 in connection with the bumper section A and C.

The rear ends of the bars 11 are curved inwardly and provided with eyes $11^a$, this end of the bumper section being substantially identical with the end of the section A. The eyes $11^a$ receive therebetween the eye $7^a$ on a plate 7, the eyes $11^a$ and $7^a$ being connected by a bolt 6, as is the case with the anchoring of the ends of the bumper section A. The plate 7 is preferably secured to the side panel and floor in the same manner as described hereinbefore; that is to say, by means of the U-bolt 8, $8^a$ and nuts 9, the U-bolt being secured to the floor by the bolts 10.

Between the front of the section A and the front of the side of the vehicle are one or more additional bumper sections C, which are identical in construction with the section B, except as to matter of length, section B being longer than the section C in order to enable section B to extend across the rear wheel housing. The rear ends of the upper and lower bars 15 of each section C are secured to the front portions of the bars 5 of section A and preferably at the rear of the curved front ends of said bars 5 by means of clamping plates 12 and 13 and a bolt 14, such as shown in detail in Fig. 3. The front ends of the plates 15 will be secured to the side of the vehicle in the same manner as are the ends of the bars 5. In Fig. 1, the side panel 2, floor 1, and the bumper bars adjacent thereto are broken away, thus indicating that several sections similar to the sections C may be interposed between the front of section A and the front of the vehicle dependent upon the length of the vehicle body and the length of the bumper sections. The front ends of the plates of the foremost section will be provided with eyes 16 secured by a bolt 17 to the interposed eye $7^a$ on the plate 7, the construction for anchoring the front ends of each section C being preferably identical with that employed in connection with the ends of the section A.

By reason of the construction and arrangement of parts shown and described herein, the side of a vehicle of the omnibus type may be provided with efficient bumper protection without the necessity for altering the construction of the vehicle and with only the addition thereto of the comparatively inexpensive attaching devices comprising the U-bolts 8, $8^a$ and the plates 7. Furthermore, the sections of which the bumper, as a whole, is composed are readily secured together so as to form a unitary longitudinal bumper; and, by disengaging the clamping plates 12 and 13 at the front of the rear section B, such rear section may be conveniently swung about its eyes $11^a$ as a pivot when it is desired to have access to the wheel within its housing.

For convenience of description, the wheel housing has been assumed to be a housing for a rear wheel of the vehicle and to be adjacent to the rear end of the body; and the terms "front" and "rear" have been used to designate the relative positions of the bumper parts, but without any intention thereby to limit ourselves to the use of our bumper or bumper sections with such special part of the vehicle body. Furthermore, the U-bolts 8 may be secured directly to the sills $1^a$ instead of indirectly thereto, through the floor 1; but, in either case, the bolts will be supported from the floor structure.

The clamp plates 12 and 13 connecting the bars of the main and auxiliary sections allow adjustability of the auxiliary section to permit standard lengths of bars to be used in constructions of varying dimensions. These clamps also provide a frictional engagement between the sections so that if a blow is struck upon the auxiliary section the force of the impact will first cause a deflection of the impact bar and if of sufficient strength will cause the bars to slip through the clamp and the force of the blow will be resisted by the friction resulting therefrom.

Having thus described our invention, what we claim is:—

1. The combination, with the floor structure and a side of a vehicle body, of a U-bolt secured to said floor structure with its threaded ends extending through said side, a plate secured to the ends of said U-bolt, and a bumper carried by said side and having an end secured to said plate.

2. The combination with the floor structure and a side of a vehicle body, of a U-bolt having its body secured to said floor structure and its ends extending through said side, a bumper for the side of said vehicle, and means supporting said bumper from the projecting ends of said U-bolt.

3. The combination, with the floor structure and a side of a vehicle, of a U-bolt having a body provided with a horizontally flattened lower surface, bolts securing the said body to said floor structure with the legs of the U-bolt projecting through the said side, a plate secured to the ends of said U-bolt, and a bumper for said side having an end supported by said plate.

4. The combination with the floor structure and a side of a vehicle, of a U-bolt having a body provided with a horizontally flattened lower surface, means securing the said body to said floor structure with the legs of the bolt projecting through the said side, a bumper for said side and means supporting said bumper from the projecting ends of said bolt.

5. The combination, with the floor structure and a side of a vehicle body, of a bumper for said side, and supporting means secured to said floor structure and extending through said side and connected to an end of said bumper for supporting such bumper end.

6. The combination, with the floor structure and a side of a vehicle body, of a bumper for said side, and supporting means secured to said floor structure and extending through said side and connected to said bumper thereby to support the latter from said floor and side.

7. The combination, with the floor structure and a side of a vehicle body, of a bumper comprising a pair of vertically spaced bars, each bar having an eye at each end thereof and the ends of the bars being projected toward the side, a pair of supporting members each having an eye, the eye on each supporting member being interposed between corresponding eyes at the ends of the said bars, and means for securing the said supporting members to the floor structure of the vehicle.

8. The combination, with the floor structure and a side of a vehicle body, of a bumper comprising a pair of vertically spaced bars, each bar having an eye at an end thereof and such ends of the bars being projected toward the side, a supporting member having an eye interposed between the eyes of the said bars, and means for securing the said supporting member to the floor structure of the vehicle.

9. The combination, with the floor structure and a side of a vehicle body, of a bumper comprising a pair of vertically spaced bars, each bar having an eye at each end thereof and the ends of the bars being projected toward the side, a pair of U-bolts each having its body fastened to the floor structure of the vehicle and the ends thereof projecting through said side, a plate secured to the projecting ends of each U-bolt, each plate having an eye interposed between the eyes on the ends of the bars adjacent thereto, and bolts extending through such aligned eyes.

10. The combination, with the floor structure and a side of a vehicle body, of a bumper comprising a pair of vertically spaced bars, each bar having an eye at an end thereof and such ends being projected toward the side, a U-bolt having its body fastened to the floor structure of the vehicle and the ends thereof projecting through said side, a plate secured to the projecting ends of said U-bolt and having an eye interposed between the eyes on the ends of the bars adjacent thereto, and a bolt extending through such aligned eyes.

11. The combination, with a side of a vehicle having a wheel housing adjacent the rear end thereof, of a bumper comprising a main section supported from said side in front of said housing, a bumper section secured at its front end to the main bumper section and extending across the said wheel housing and supported from the side at the rear of said housing, and a bumper section having its rear end secured to the main section and its front end supported from the side.

12. The combination, with a side of a vehicle, of a bumper comprising a main section supported from said side, a bumper section secured at its front end to the main bumper section and extending rearwardly therefrom and having its rear end pivotally supported from the side, a bumper section having its rear end secured to the main section and extending forwardly therefrom and having its front end pivotally supported from said side.

13. The combination, with a side of a vehicle having a wheel housing adjacent the rear end thereof, of a bumper comprising a main section, the said main section having a pair of vertically spaced bumper bars supported at their ends from the said side in front of said housing, a second bumper section comprising a pair of vertically spaced bars having their front ends detachably connected to the rear portions of the first mentioned bars and extending rearwardly across said wheel housing and having their rear ends pivotally supported from the side of the vehicle body, and a front bumper section comprising a pair of bars having their rear ends detachably connected to the front end portions of the first section and having their front ends supported from the side of the vehicle.

14. The combination, with a side of a vehicle having a wheel housing adjacent the rear end thereof, of a bumper comprising a main section, the said main section supported at its ends from the said side, a second bumper section comprising a bar having its front end detachably connected to the rear portion of the first section and extending rearwardly across said wheel housing and having its rear end supported from the side of the vehicle body, and a front bumper section comprising a bar having its rear end connected to the front end portion of the first section and having its front end supported from the side of the vehicle.

15. The combination, with a side of a vehicle having a wheel housing adjacent the rear thereof, of a bumper for said side, said bumper comprising a main bumper section supported from the side in front of the said wheel housing, an auxiliary section extending across the said housing and having its front portion detachably secured to the main bumper section and its rear end pivotally supported by the side at the rear of said housing, and a front section having its front end supported from the side of the vehicle in front of the main section and having its rear end connected to said main section.

16. The combination, with a side of a vehicle having a wheel housing adjacent the rear thereof, of a bumper for said side, said bumper comprising a main bumper section supported from the side in front of the said wheel housing, and an auxiliary section extending across the said housing and having its front portion detachably secured to the main bumper section and its rear end pivotally supported from the side at the rear of said housing and adapted to swing in a horizontal plane.

17. A bumper comprising a main section supported from a vehicle and an auxiliary section having one end supported by the vehicle and the other end adjustably mounted upon the main section.

18. A bumper comprising a main section supported from a vehicle and a plurality of auxiliary sections extending from said main section each having an end supported from the vehicle and an end adjustably mounted upon the main section.

19. A bumper comprising a main section supported from a vehicle, an auxiliary section extending from an end portion of said main section and having one end pivotally supported from said vehicle and the other end adjustably connected to said main section.

20. A bumper comprising a main section supported at its end portions from a vehicle, a plurality of auxiliary sections extending from end portions of said main section and each having one end pivotally supported from the vehicle and the other end adjustably connected to said main section.

21. A bumper comprising a section supported from the vehicle, an impact section connected at one end portion to the vehicle and at the other end portion to the first mentioned section, and means for frictionally engaging said connected sections.

22. A bumper comprising a section supported from a vehicle, an impact section connected at an end portion to the first mentioned section and pivotally connected at the other end portion to the vehicle, and means for frictionally engaging said sections at their point of connection.

23. A bumper comprising an impact section supported at an end portion from a vehicle, a plurality of impact sections extending from the end portions of the first mentioned section and having their remote ends pivotally connected to the vehicle, and means for frictionally engaging the adjacent end portions of the impact sections.

24. The combination, with the side of a vehicle and a wheel housing, of a main bumper section supported from the said side and an auxiliary bumper section adapted to extend across said wheel housing, said auxiliary section having one end supported from the vehicle and the other end adjustably connected to the said main section.

25. The combination, with the side of a vehicle and a wheel housing, of a main bumper section supported from said vehicle and an auxiliary section adapted to extend across said wheel housing, said auxiliary section having one end supported from the vehicle and the other end connected to the main bumper section, and means for frictionally engaging the connected sections.

26. A bumper comprising a pair of vertically spaced impact bars having eyes at their ends, means for pivotally supporting said bars through said eyes from the vehicle, a pair of vertically spaced impact bars, each in alignment with, and adapted to be clamped at an end portion to an end portion of one of said first mentioned bars, and having an eye at the other end, means associated with said eyes for pivotally supporting the remote ends from the vehicle, and means for clamping the adjacent end portions of the bars.

27. In combination with an automobile, a steel strip parallel to the side thereof and spaced therefrom, said strip consisting of two parts, one of said parts being pivoted at one end and removably attached at the other end.

In testimony whereof, we hereunto affix our signatures.

HERBERT S. JANDUS.
FRANCIS H. GOODRICH.